June 22, 1965 W. D. FULLER 3,191,098

STRUCTURALLY INTEGRATED CAPACITOR ASSEMBLY

Filed May 26, 1960 3 Sheets-Sheet 1

INVENTOR.
WILLIAM D. FULLER
BY
George Sullivan
Agent

June 22, 1965 W. D. FULLER 3,191,098

STRUCTURALLY INTEGRATED CAPACITOR ASSEMBLY

Filed May 26, 1960 3 Sheets-Sheet 2

INVENTOR.
WILLIAM D. FULLER

BY George C. Sullivan
Agent

STRUCTURALLY INTEGRATED CAPACITOR ASSEMBLY

Filed May 26, 1960

INVENTOR.
WILLIAM D. FULLER
BY
George Sullivan
Agent

United States Patent Office 3,191,098
Patented June 22, 1965

3,191,098
STRUCTURALLY INTEGRATED CAPACITOR ASSEMBLY

William D. Fuller, Palo Alto, Calif., assignor to Lockheed Aircraft Corporation, Burbank, Calif.
Filed May 26, 1960, Ser. No. 31,947
4 Claims. (Cl. 317—101)

This invention generally relates to electronic capacitor components and more particularly, to a structurally integrated capacitor assembly and the fabrication thereof.

With the increasing attention now being given to the microminiaturization of electronic circuitry because of military and space requirements, the development of highly stable and more efficiently constructed miniaturized electronic components and assemblies has taken on new importance. However, considerable problems have arisen, such as the difficulty of obtaining components which remain stable up to the high temperatures of operation necessary in many military and space applications. Also, although miniaturized electronic components have been fabricated in some cases, the interconnection therebetween has remained a considerable problem.

The present invention is concerned primarily with capacitor components and assemblies, and its broad object is to provide improved constructions and fabrication techniques for capacitor components and assemblies.

A more specific object of this invention is to provide structurally integrated capacitor components and assemblies which are stable at very high temperatures of operation.

Another object of this invention is to provide a structurally integrated capacitor assembly which permits more efficient use of a given volume.

Still another object of this invention is to provide a structurally integrated capacitor assembly which requires no soldered interconnections between the individual capacitor components of the assembly.

A further object of this invention is to provide a method for fabricating a structurally integrated capacitor component or assembly of components which is relatively inexpensive and lends itself to mass production techniques.

In a typical embodiment of the invention, the above objects are realized by forming each capacitor component as a film of dielectric material sandwiched between two thin films of conductive material on the inner surface of a hole in a suitable substrate, the capacitor components so formed being interconnected by means of a conductive wiring pattern etched on opposite sides of the substrate. Also, one or more other types of electronic components may be disposed in the empty portions of the capacitor component holes and suitably soldered to the wiring pattern in order to achieve a high component density.

The specific nature of the invention as well as other objects, uses and advantages thereof will clearly appear from the accompanying description and drawings in which:

FIGS. 1–10 illustrate various steps in the fabrication of a structurally integrated capacitor component in a hole in a portion of a substrate, in accordance with the invention. FIGS. 2, 4, 6 and 8 are cross-sectional front views of top views 1, 3, 5, 7 and 9, respectively, taken along the lines indicated.

Like numerals designate like elements throughout the figures of the drawing.

In FIGS. 1–10, typical steps are shown for fabricating a structurally integrated capacitor component in a hole 22 in a portion of an insulative substrate 20. The substrate 20 may be any of a variety of suitable materials such as fused silica, quartz, glass, alumina and magnesium oxide. Although FIGS. 1–10 illustrate the fabrication of only a single capacitor component, it is to be understood that any number of components can be simultaneously formed in the substrate 20 to provide any desired predetermined capacitor assembly.

Figures 1, 2, 3, 4, 5, 6:
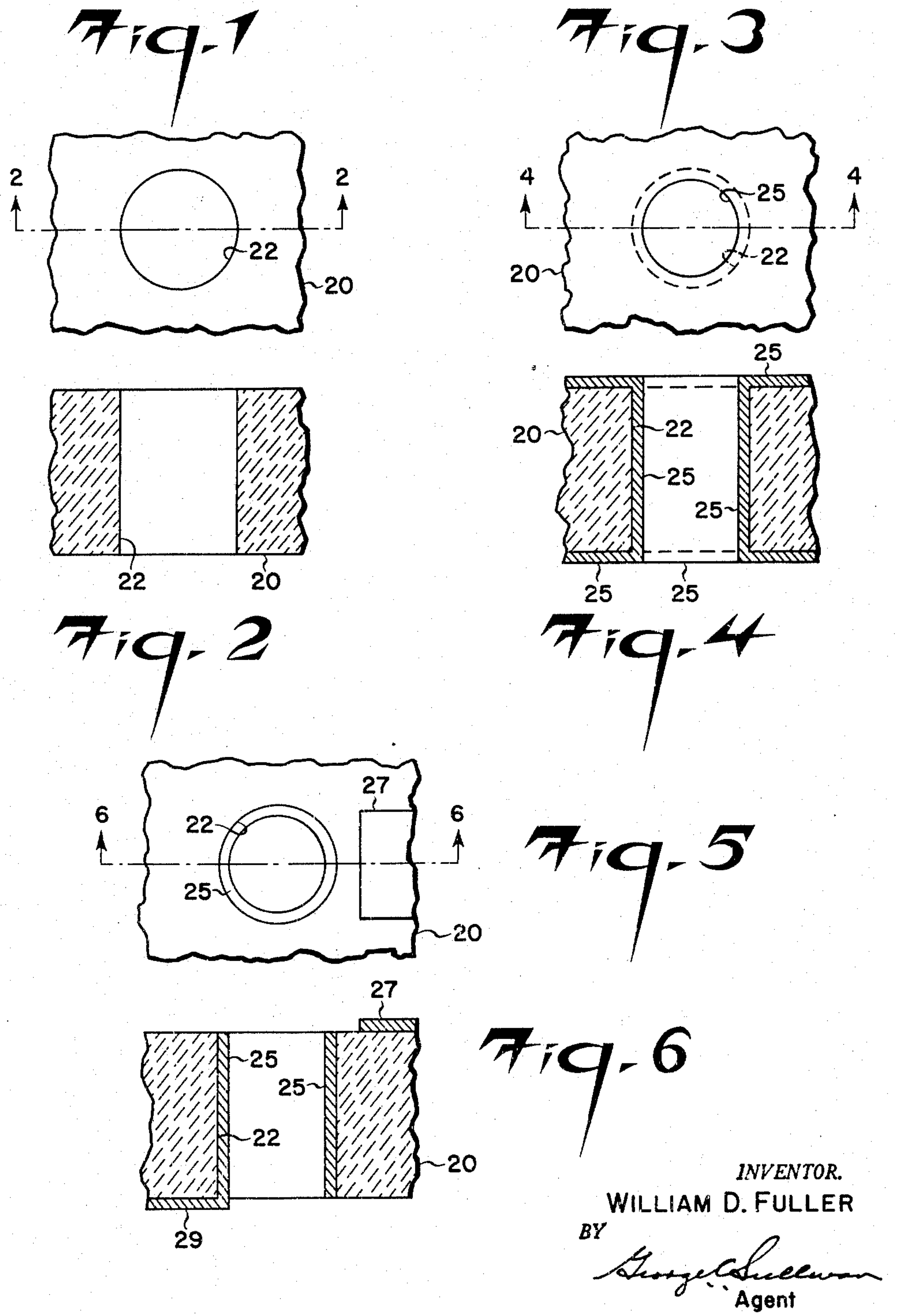

As shown in FIGS. 1 and 2 a hole is bored through the substrate 20 for each capacitor component to be provided, the diameter of the hole 22 being chosen in accordance with the value of capacitance desired, as will hereinafter become evident. A thin titanium film 25 is now coated on the surfaces of the substrate 20, including the inner surface of each hole 22 as shown in FIGS. 3 and 4. This may be accomplished by a method such as is disclosed in U.S. Patent No. 2,746,888.

The flat faces of the titanium coated substrate are now etched using well known etchants and paint resists to provide any desired titanium wiring patterns thereon, such as might be required for interconnecting the capacitor components in a desired manner. The titanium film leads 27 and 29 on the top and bottom faces of the substrate 20 in FIGS. 5 and 6 indicate the portions of the etched wiring pattern corresponding to one capacitor component. The lead 27 on the top face is spaced from the titanium coated hole 22 and makes no contact with the titanium coating 25, while the lead 29 on the bottom face is adjacent the hole 22 and makes electrical contact with the titanium coating 25.

A dielectric film is now formed on the titanium film 25. An advantageous way of accomplishing this is by anodization. In order to confine the anodization to the specific surfaces upon which the dielectric film is to be formed, the titanium film portions to be protected are first coated with a protective paint or epoxy resist. In FIGS. 5 and 6, the portions which are to be protected from anodization are the titanium film leads 27 and 29.

Figures 7, 8, 9, 10:
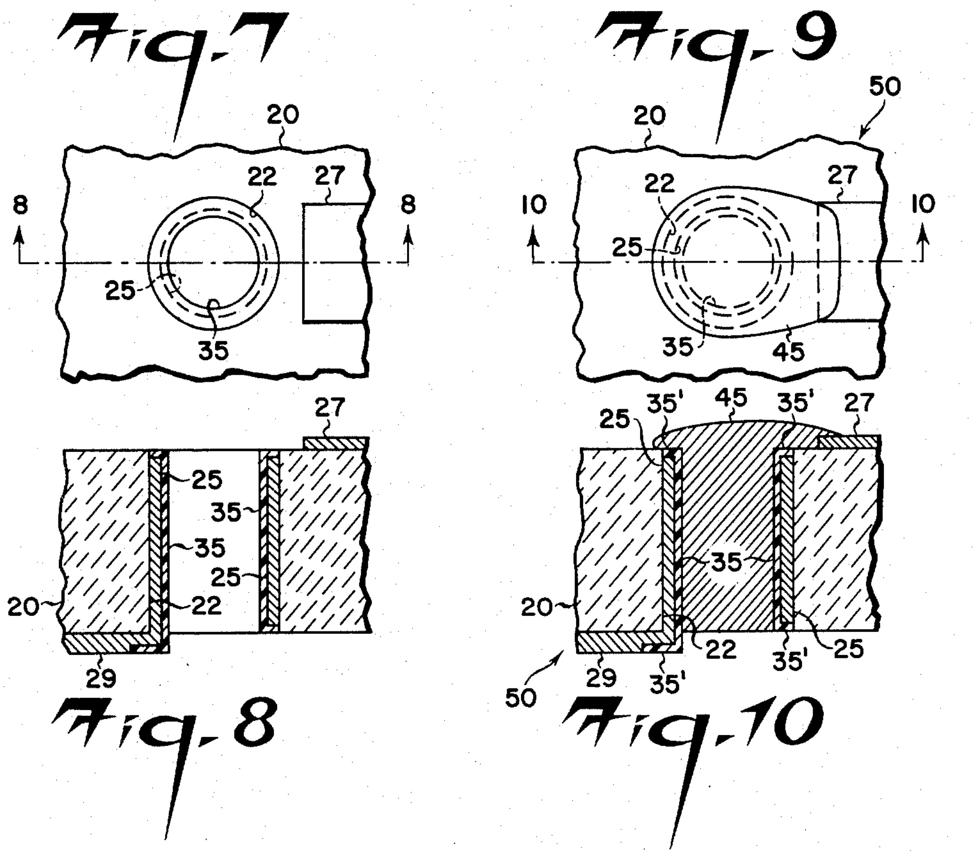

The substrate 20 is then immersed in an anodizing bath, such as a bath consisting of a saturated sodium perborate $NaBO_3$ solution, and a suitable anodizing voltage is applied between the unprotected titanium coating 25 and a cathode also immersed in the bath. This anodizing treatment forms a thin, hard dielectric film 35 on the unprotected portions of the titanium coating 25, such as is illustrated in FIGS. 7 and 8, the only connection to the titanium film 25 in the hole 22 being by means of the titanium film lead 29. The dielectric film 35 is provided to serve as the dielectric of the capacitor component being fabricated, the inner titanium film 25 serving as one of the plates thereof.

The other plate of the capacitor component can be provided in a number of ways. One such way is illustrated in the capacitor component 50 of FIGS. 9 and 10 in which the other plate is formed by packing the remaining portion of the hole with a silver paste material 45 and overlapping the silver paste material 45 on the top face to make electrical contact with the lead 27 as shown. The dielectric film portions 35' formed during anodizing prevent the silver paste material from making contact with the titanium film 25 or the lead 29 so as to prevent shorting out the capacitor component. Between the leads 27 and 29, therefore, will appear a capacitance formed by the dielectric film 35 sandwiched between the conductive titanium film 25 serving as one plate and the conductive silver paste material 45 serving as the other plate.

Figure 11:
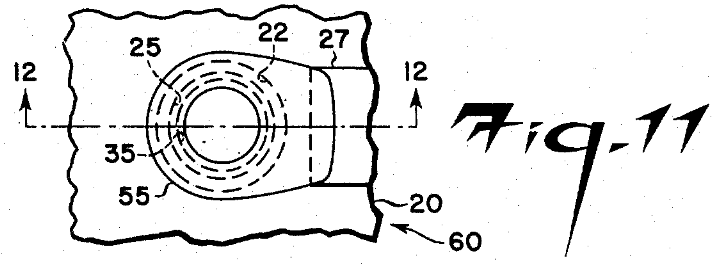
FIGS. 11 and 12, are respectively top and cross-sectional front views illustrating an alternative final step which may be employed instead of the step illustrated in FIGS. 9 and 10.
Figure 12:
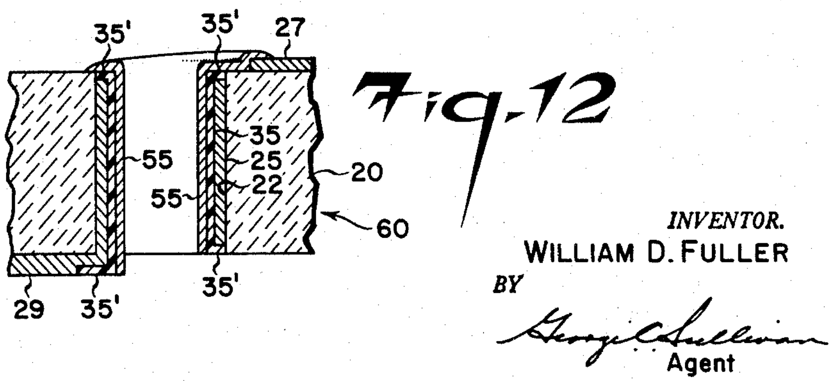

While the use of the silver paste material 45 is an adequate way of providing the other plate of the capacitor component, a more advantageous way is to provide the other plate as a thin conductive film 55 on the dielectric film 35 as shown in the alternate capacitor component 60 of FIGS. 11 and 12. This conductive film 55 may be a conductive silver paint such as Du Pont Silver, or a conductive lacquer such as Hanovia Platinum. As in the embodiment of FIGS. 9 and 10, the dielectric film portions 35' in the embodiment of FIGS. 11 and 12 prevent the conductive film 55, which forms the other plate of the capacitor component 60, from making contact with the titanium film 25 or the lead 29 so as to prevent shorting out the capacitor component. The empty portion of the hole 22 in the embodiment of FIGS. 11 and 12 is now available for the containment of another type of electronic component, such as a diode.

Figure 13:
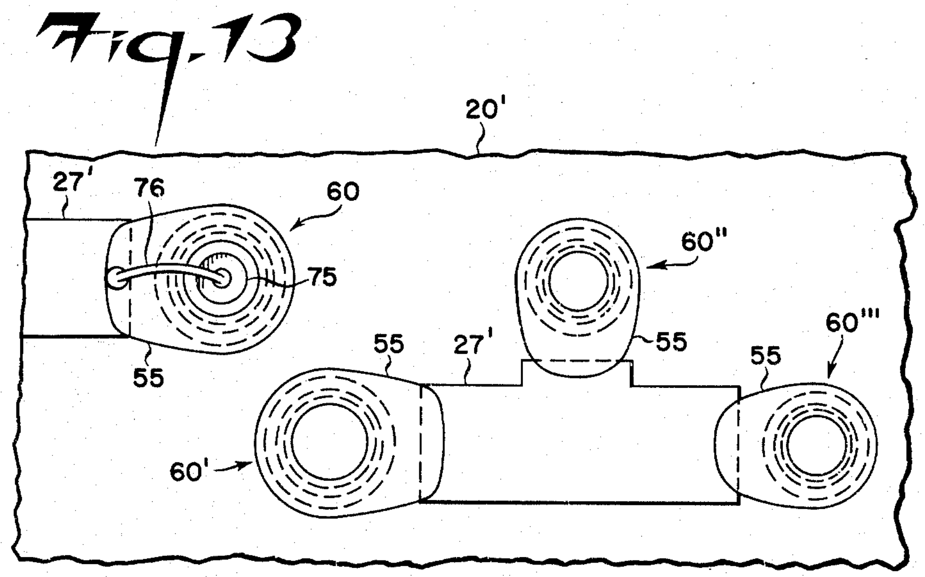
FIGS. 13 and 14 are respectively top and bottom views of an embodiment of a structurally integrated capacitor assembly in accordance with the invention.
Figure 14:
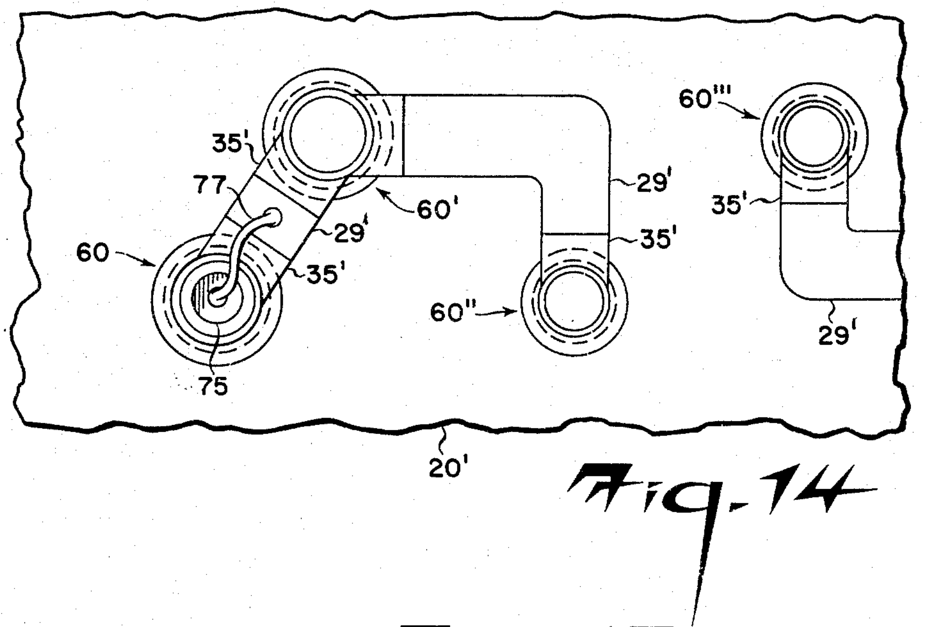

FIGS. 13 and 14 are respectively top and bottom views of an embodiment of a four capacitor assembly comprising the tubular film capacitor components 60, 60', 60'' and 60''' which may be simultaneously fabricated in the substrate 20' as just described. These capacitor components are essentially as shown in the alternate embodiment of FIGS. 11 and 12. The titanium film interconnection pattern on the top face of the substrate 20' is indicated at 27' and on the bottom face as 29'. The dielectric film portions which prevent shorting are indicated at 35'.

If desired, a component may be contained in any or all of the empty holes of the tubular film capacitor components in order to achieve a high component density, such as is illustrated by a diode 75 in the hole of the capacitor component 60 with the diode lead wires 76 and 77 respectively connected to the titanium film interconnection patterns 27' and 29' as shown in FIGS. 13 and 14.

Figure 15:
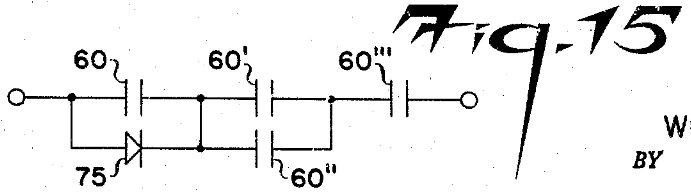
FIG. 15 shows schematically the electric circuit assembly FIGS. 13 and 14.

It will be appreciated that the particular arrangement of the capacitor components 60, 60', 60'' and 60''' shown in FIGS. 13 and 14 is merely illustrative, as is the interconnection pattern therebetween illustrated by the titanium film patterns 27' and 29'. Any other interconnection pattern could be suitably etched on the faces of the substrate 20'. FIG. 15 shows the equivalent electrical circuit diagram of the capacitor assembly of FIGS. 13 and 14 for the particular interconnection patterns 27' and 29' shown in FIGS. 13 and 14.

The determination of the capacitance value of each capacitor component in an assembly such as shown in FIGS. 13 and 14 will become evident from the following considerations.

First, as a result of the anodization treatment to which the substrate is subjected in order to form dielectric films on the titanium coating in the holes, it will be realized that the thickness of the dielectric film 35 produced will be substantially the same for each hole, regardless of their diameter, since all holes are subjected to the same anodizing treatment. Thus, from well known theory with regard to capacitance, it can mathematically be shown that the capacitance C of any capacitor component may be written as:

$$C=0.703\frac{K}{t}dL$$

where $t$ is the thickness of the dielectric film 35, K is its relative dielectric constant, L is the thickness of the substrate 20' (that is, the length of the hole), and $d$ is the diameter of the originally bored hole 22. The above equation assumes that the thickness of the dielectric film 35 is very much smaller than the diameter $d$, which is usually the case.

The relative values of the capacitor components 60, 60', 60'' and 60''' may thus be chosen by appropriately choosing their diameters $d$ in proper relation to one another. The thickness $t$ and dielectric constant K of the dielectric film 35 then determines the absolute values of the capacitor components. A convenient way of monitoring the dielectric film 35 being formed during the anodization process is to make an A.-C. capacitance measurement between the etched pattern 29' and the anodizing fluid. The substrate 20' may then be subjected to the anodizing treatment until a predetermined A.-C. capacitance is measured, corresponding to the desired absolute values of the capacitor components.

In the embodiments and methods described herein, it will be noted that titanium has been used as the basic material from which the structurally integrated assembly is fabricated. It is to be understood that the invention is not limited to the use of titanium or to the specific arrangements and techniques described herein. Other materials and other techniques and arrangements could also be employed. For example, tantalum, silicon and tungsten form film oxides which could satisfactorily be used as a dielectric film. However, the use of titanium is advantageous in that it permits highly stable capacitor component assemblies to be conveniently and economically fabricated by techniques which are amenable to semi-automatic and automatic production.

The invention is to be considered as including all possible modifications and variations in construction, arrangement and procedures coming within the scope of the invention as defined in the appended claims.

I claim as my invention:

1. A capacitor component assembly comprising an insulative substrate having a plurality of holes therein, a first conductive film coated on the inner surface of each hole, a dielectric film coated on the inner surface of the first conductive film in each hole, a second conductive film coated on the inner surface of the dielectric film in each hole, conductive films on the faces of said substrate electrically interconnecting said first and second conductive films in said holes in a predetermined manner and at least one electronic component additionally provided in at least one of said holes electrically connected to said conductive films on the faces of said substrate.

2. A capacitor comprising an insulative substrate having an aperture therein, a conductive film coated on the inner surface of said aperture, said conductive film consisting essentially of a metal capable of being anodized, a dielectric film on the inner surface of said conductive film, said dielectric film consisting essentially of an oxide of the material of which said conductive layer essentially consists, and a conductive material in contact with the inner surface of said dielectric film.

3. The invention of claim 2 wherein said conductive film consists essentially of titanium metal.

4. A capacitor comprising an insulative substrate having an aperture therein, a conductive film coated on the inner surface of said aperture, said conductive film consisting essentially of a metal capable of being anodized, a dielectric film on the inner surface of said conductive film, said dielectric film consisting essentially of an oxide of the material of which said conductive layer essentially consists, a conductive material in contact with the inner surface of said dielectric film, a conductive film on one surface of said substrate connected to said inner conductive film, and a conductive film on the opposite surface of said substrate connected to said conductive material in contact wtih the inner surface of said dielectric film.

(References on following page)

References Cited by the Examiner

UNITED STATES PATENTS

| | | | |
|---|---|---|---|
| 2,474,988 | 7/49 | Sorgrove | 317—242 |
| 2,702,878 | 2/55 | Heibel | 317—242 |
| 2,748,328 | 5/56 | Font et al. | 317—257 |
| 2,754,230 | 7/56 | McLean et al. | 117—212 |
| 2,759,854 | 8/56 | Kilby | 117—217 |
| 2,871,428 | 1/59 | Shen | 317—242 |
| 2,872,391 | 2/59 | Hauser | 317—101 |
| 2,892,130 | 6/59 | Kilby | 317—101 |
| 2,972,570 | 2/60 | Haas | 317—101 |
| 2,973,490 | 2/61 | Schlicke | 317—256 |
| 3,052,824 | 9/62 | Haken et al. | 317—242 |

JOHN F. BURNS, *Primary Examiner.*

SAMUEL BERNSTEIN, E. JAMES SAX, LARAMIE E. ASKIN, *Examiners.*